United States Patent [19]
Schomakers

[11] Patent Number: 5,464,298
[45] Date of Patent: Nov. 7, 1995

[54] CONNECTOR FOR STRUCTURE MEMBERS

[75] Inventor: Franz Schomakers, Geeste, Germany

[73] Assignee: intur System-Profil GmbH + Co., Geeste, Germany

[21] Appl. No.: 57,719

[22] Filed: May 4, 1993

[30] Foreign Application Priority Data

May 19, 1992 [DE] Germany .................. 42 16 439.7

[51] Int. Cl.$^6$ ................................ F16B 7/04
[52] U.S. Cl. .................. 403/252; 403/255; 403/257; 403/322; 24/588; 24/606
[58] Field of Search ................ 403/43, 44, 45, 403/46, 9, 322, 323, 325, 252, 255, 256, 257; 24/606, 607, 625, 588, 287

[56] References Cited

U.S. PATENT DOCUMENTS

| | | | |
|---|---|---|---|
| 4,101,231 | 7/1978 | Streib | 403/322 |
| 4,345,849 | 8/1982 | Stenemann | 403/257 |
| 4,455,103 | 6/1984 | Hackenberg | 403/322 |
| 4,799,819 | 1/1989 | Swoboda | 403/252 |
| 4,815,179 | 3/1989 | Klaric | 24/606 |
| 4,974,987 | 12/1990 | Smock | 403/322 |
| 5,143,474 | 9/1992 | Vieler | 403/252 |

Primary Examiner—Richard A. Bertsch
Assistant Examiner—William Wicker
Attorney, Agent, or Firm—Jordan and Hamburg

[57] ABSTRACT

A turnbuckle for connecting a hollow section is provided with a catch recess, with a carrier element having a clamping edge shoulder, the turnbuckle including a housing which fits within the hollow section. The housing has a longitudinal axis with an abutment pin fixed in the housing substantially transverse to the longitudinal axis. A clamping spring is movable in a translational manner within the housing, the clamping spring having a clamping finger part formed by two clamping fingers which are movable in mutually opposite directions substantially transverse to the longitudinal axis of the housing. Each clamping finger has a clamping hook end. A rotatable catch is provided for locking the housing with respect to the hollow section, the catch being engageable within the catch recess of the hollow section, and for moving the clamping spring between a starting stretching position and a final stretching position upon rotation of the catch, such that the clamping finger part engages with the abutment pin during movement from the starting stretching position to the final stretching position to force the clamping finger part to grip behind the clamping edge shoulder of the carrier element in the final stretching position. Each of the clamping spring and the rotatable catch includes a curvilinear catch link, and a cam follower bolt provides for immovably connecting the clamping spring and the catch together, the cam follower bolt being in both the clamping spring and the rotatable catch and engaging with each curvilinear catch link.

17 Claims, 5 Drawing Sheets

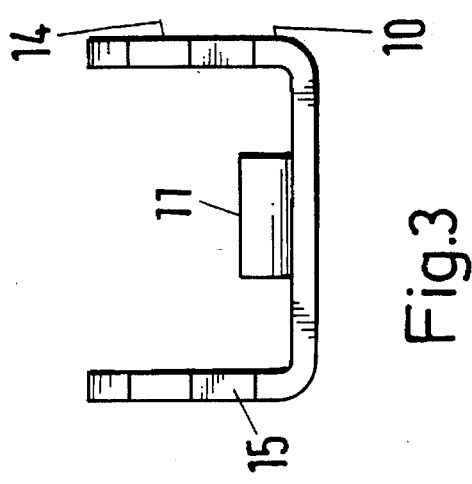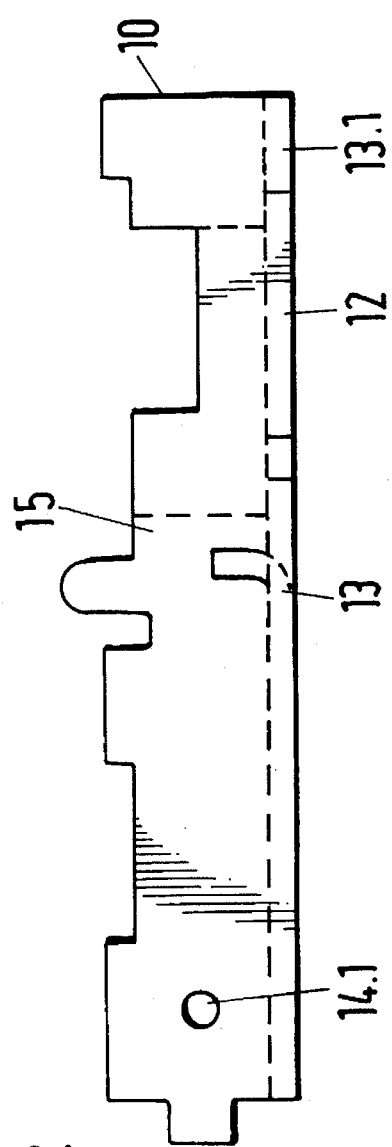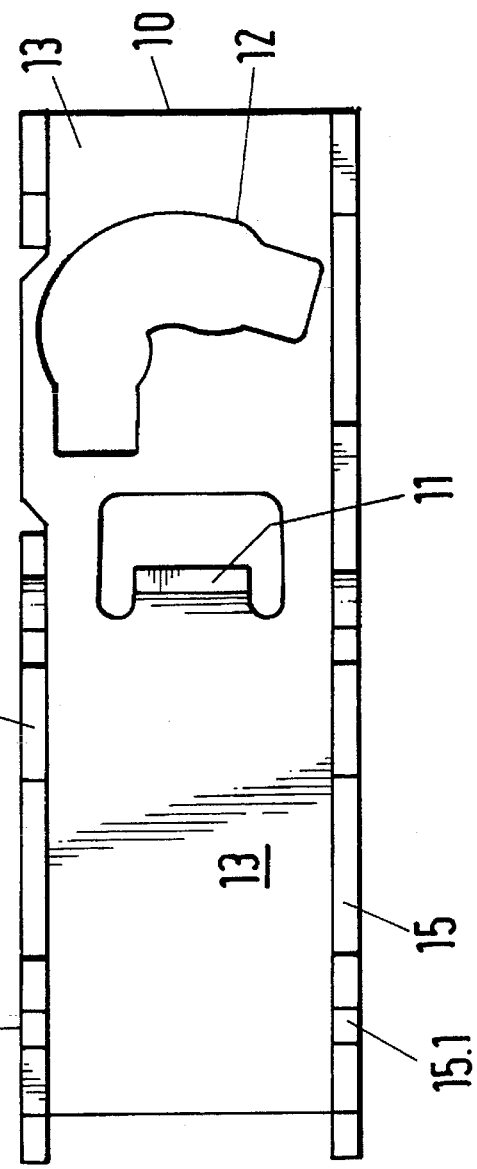

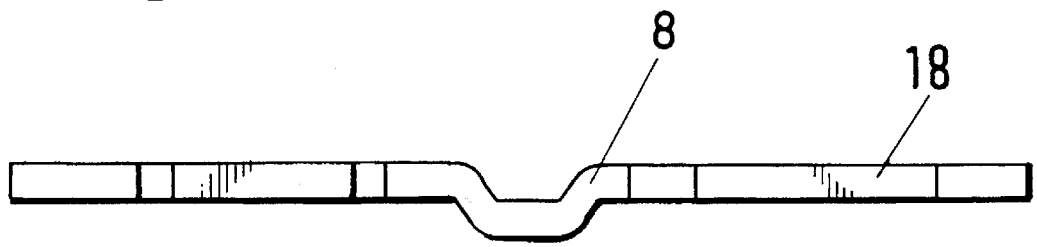
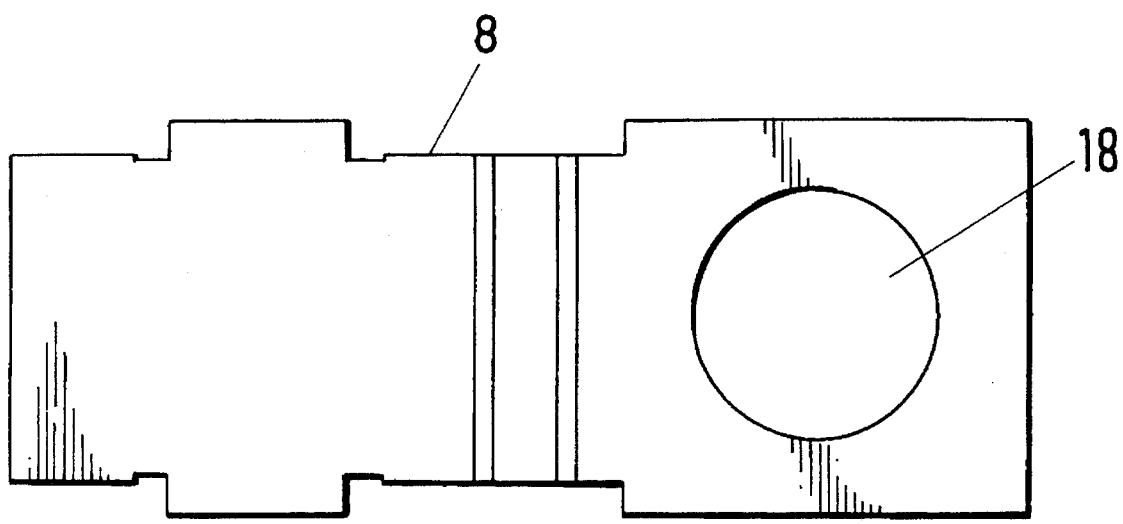

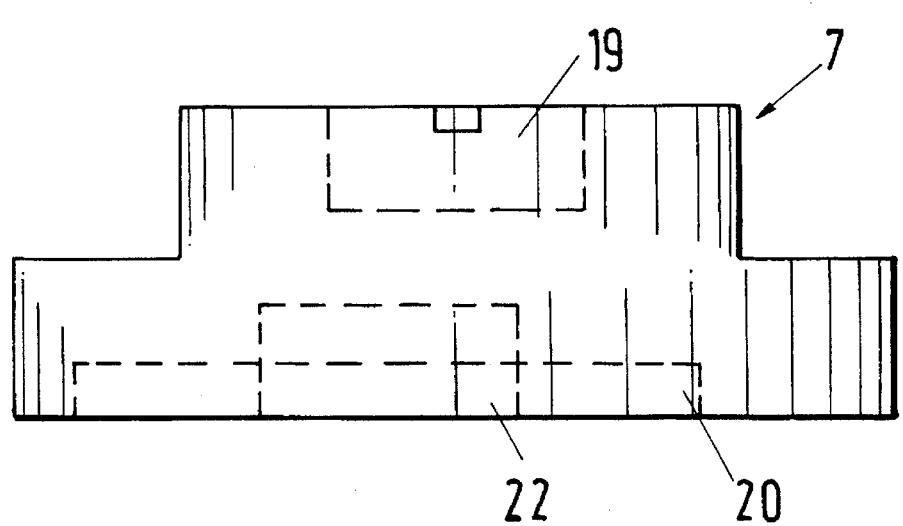
Fig. 8
Fig. 9
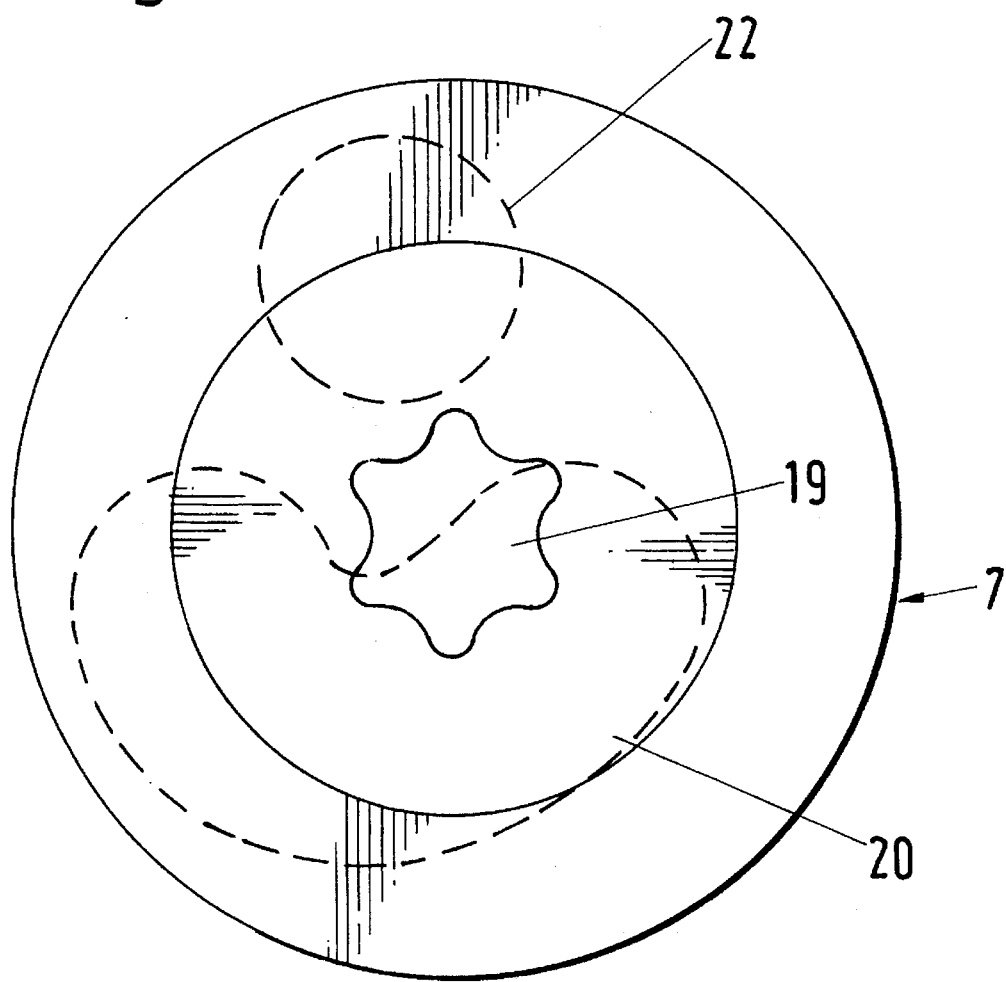

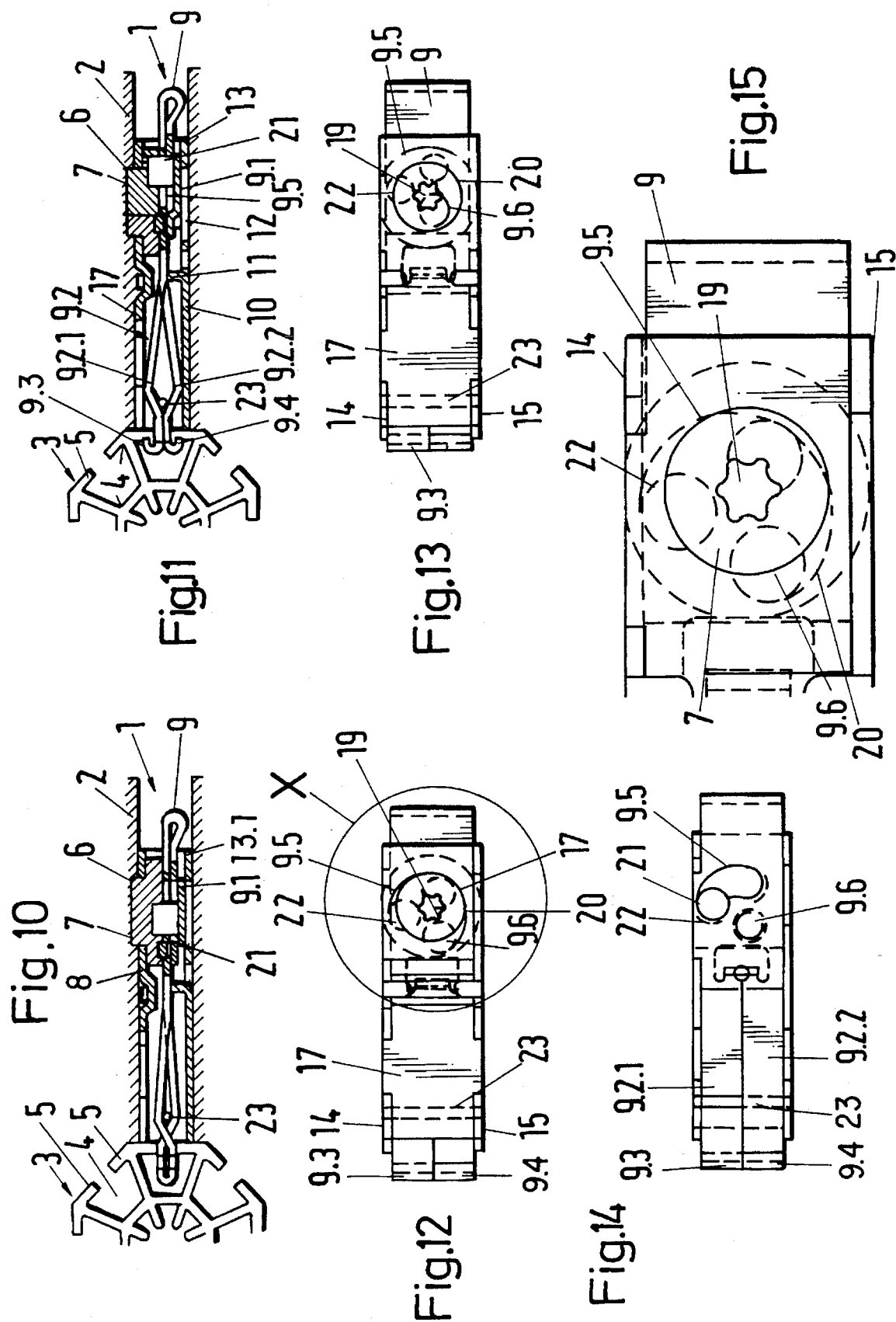

CONNECTOR FOR STRUCTURE MEMBERS

BACKGROUND OF THE INVENTION

The invention relates to a turnbuckle for connecting a hollow section, which is provided with a catch recess, with a carrier element having a clamping edge shoulder, and particularly for connecting hollow section rods with vertical supports, which are provided with undercut grooves as clamping edge shoulders and are intended for racks, which can be put together and taken apart, with a housing, which can be introduced into the hollow section, and locked in the catch recess of the hollow section by means of a catch and with a clamping spring, which can be converted by a rotating motion of the catch from a starting stretching position to a final stretching position and with a clamping finger part, which in the final stretching position grips behind the clamping edge shoulder, the clamping spring and the catch being disposed movably in the housing and the clamping finger part being movable in the course of the stretching motion of the clamping spring over an abutment, which can be fixed in the housing, into a stretching-spreading position, which is directed transversely to the longitudinal axis of the housing.

A turnbuckle of the aforementioned type is known from the EP-A-O 059 463. In the case of this turnbuckle, the catch is constructed as a cam, which grips through a hole-shaped recess of the housing. In the starting stretching position, the catch can be depressed by way of the clamping spring, so that, after being depressed, it can be introduced together with the housing into the interior of the hollow section. In the installed position, a hollow section recess, which overlaps the catch, is provided in the hollow section, so that the catch locks in the hollow section recess under the influence of the force of the clamping spring and ensures that the turnbuckle is connected reliably with the hollow section. In the final stretching position of the clamping spring, in which the hook-shaped end of the clamping finger part and of the clamping spring is locked over the cam of the catch behind the clamping edge shoulder of the carrier element, the catch is prevented from being impressed by a supporting element in the side of the housing. The clamping finger part or clamping spring has inclined surfaces interacting with indentations in the side of the housing in order to be able to carry out, in the course of the catch movement, a stretching-spreading motion directed transversely to the longitudinal axis of the housing. This makes greater demands on the accuracy of fit of the parts. Accordingly, the cam of the catch element has to be manufactured very precisely, in order to be able to use the cam, which is supported on only one side, with a manageable expenditure of force reliably for fastening the turnbuckle and, with that, the hollow section to the supporting element. Nevertheless, the forces, which must be employed for manually bracing this turnbuckle, are appreciable.

SUMMARY OF THE INVENTION

It is an object of the present invention to provide a turnbuckle of the initially named type, with which a hollow section can be reliably fastened to a supporting element, yet can be operated in an easily handled manner.

To accomplish this objective, the turnbuckle of the initially named type is distinguished by the fact that the clamping spring and/or the catch have a curvilinear catch link interacting with a cam follower bolt, which engages the curvilinear catch link and connects the clamping spring and the catch immovably.

For the inventive turnbuckle, the catch element can do completely without cam-shaped shoulders. Instead, in a structurally simple manner, only one recess, which is engaged by the cam follower bolt, is provided in the simplest embodiment in a structurally simple manner either at the catch or at the clamping spring. On the other hand, the catch engages the track-shaped catch link that is provided at the clamping spring or the catch. By these means, the rotational motion of the catch can be converted reliably into the translatory stretching motion of the clamping spring or the clamping finger part. The parts required for this, particularly also cam follower bolts, can be a conventional commercial bolt part with appropriate dimensions, which can engage catch links, such as punched out or cut out areas, which can be produced at little expense, in such a manner, that the forces that have to be applied are less than the forces that have to be applied for known turnbuckles. Preferably, the clamping spring, as well as the catch, in each case have a catch link, which is also engaged by a separate catch bolt part, which can be detachable or integrally molded. By these means, a double support and, with that, a reliable interaction can be ensured without the danger of tilting in the course of the stretching motion. Should a break occur in a force transfer part, such as a cam follower bolt, the other cam follower bolt with the assigned catch link ensures the functional reliability of the turnbuckle.

In order to be able to fix the turnbuckle exceptionally reliably to the clamping edge shoulders of preferably undercut grooves of supporting profiles, a further development of the inventive turnbuckle provides that the clamping finger part of the clamping spring has two clamping fingers, which can be moved in mutually opposite directions transversely to the longitudinal housing axis. In the stretched and, with that, mounted state of a hollow section at the carrier element, the two clamping fingers lock at opposite edge shoulder regions and, in so doing, apply oppositely directed stretching forces on the supporting profile. With that, it is ensured that the hollow section is fastened with exceptional load carrying capability and reliability. These two clamping fingers can also be handled easily by the cam follower bolts and the catch links, particularly if the appropriate catch links or cam follower bolts are provided in the catch element as well as in the clamping spring. In a structurally simple manner and without the need for indentations, inclined surfaces, etc. in the side of the housing, the stretching-spreading movement of the clamping finger part or the two clamping fingers transversely to the longitudinal direction of the housing is provided for by a cylindrical pin-shaped abutment, which is disposed in the longitudinal center plane of the housing. At the same time, the two clamping fingers encompass this central cylindrical pin in scissor-like fashion, so that the two clamping fingers of the clamping spring are automatically spread apart by a simple rotation of the catch.

BRIEF DESCRIPTION OF THE DRAWINGS

For a further explanation of the invention, reference is made to the description of the drawing and the drawing, in which:

FIG. 1 is a plan view of the bottom part of a housing of an embodiment of an inventive turnbuckle;

FIG. 2 is a sectional view of the embodiment of FIG. 1;

FIG. 3 is a view from the rear of the embodiment of FIGS. 1 and 2;

FIG. 4 is a plan view of a cover plate of the housing of

FIGS. 1 to 3;

FIG. 5 is a side view of the cover plate of FIG. 4;

FIG. 8 is a side view of a catch of the embodiment of FIGS. 1–7;

FIG. 9 is a plan view of the catch of FIG. 8;

FIG. 10 is a diagrammatic, sectional representation of the embodiment of the inventive turnbuckle in the assembled state of the parts of FIGS. 1 to 9 in the mounted state in a hollow section in the starting stretching position;

FIG. 11 is a representation similar to that of FIG. 10 in the final stretching position of the parts;

FIG. 12 is a plan view of the embodiment of FIG. 10;

FIG. 13 is a plan view of the embodiment of FIG. 11;

FIG. 14 is a representation similar to that of FIG. 12 with the cover plate removed; and FIG. 15 shows the section X of FIG. 12 on an enlarged scale.

DESCRIPTION OF THE PREFERRED EMBODIMENTS

Figure 6:
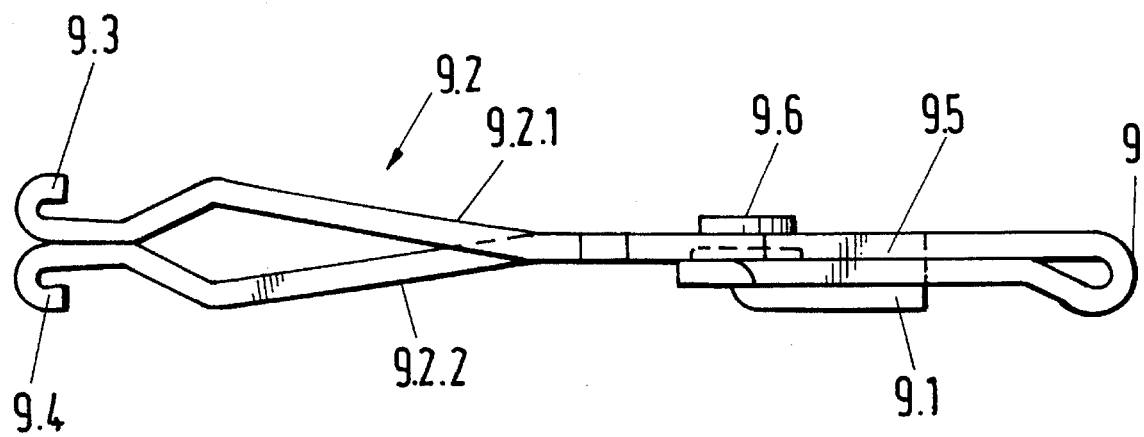
FIG. 6 is a side view of a clamping spring of the embodiment of FIGS. 1–5.

As is evident in detail from FIGS. 10 and 11, the turnbuckle, generally labelled 1 and shown in the drawing, serves to connect a hollow section 2 with a supporting profile 3, which has groove-shaped recesses 4 and therefore clamping edge shoulders 5 formed by the undercut groove recesses 4. The hollow section 2 has a hollow section recess 6, in which the catch 7 of the turnbuckle 1 can lock into place. The turnbuckle 1 includes, as a whole, a bottom part 10 of the housing (FIGS. 1 to 3), a housing cover plate 8 (FIGS. 4 and 5) and a clamping spring that is generally labelled 9 (FIGS. 6 and 7), as well as the catch 7 (FIGS. 8 and 9).

The bottom part 10 of the housing has a track-shaped recess 12 in the bottom region 13, as well as side walls 14, 15. In the bottom region 13, it has an upwardly rising projection 11, on which the spring 9 is translationally movable in the installed state of the parts. The part 9.1 of the spring (FIGS. 6, 10, 11) can be pressed into the recess 12 in the starting stretching position of the clamping spring 9 (FIG. 10), so that the catch 7 can also be pressed out of the recess 6 of the hollow section. In the final stretching position of the clamping spring 9 (FIG. 11) on the other hand, the part 9.1 of the clamping spring is to be moved over the rear end 13.1 of the bottom 13, so that the clamping spring 9 and, over the clamping spring 9, the catch 7 can be arrested and no longer pressed in for a reliable locking of the parts. The cover plate 8 of the housing has a housing recess 18, into which the upper end of the catch 7 can penetrate. The catch 7 (FIGS. 8, 9) is built up symmetrically to its vertical longitudinal center plane with a step-shaped, circular cross section and, in the embodiment shown, has a central operating opening 19, which is accessible from the outside in the installed state to rotate catch 7. In addition, a track-shaped catch link 20 is milled into bottom of the catch 7. For the introduction of a cam follower bolt 21 (FIGS. 10 and 11), it furthermore has a circular recess or borehole 22 in its bottom, in which the cam follower bolt 21 is to be disposed removably and therefore loosely.

Figure 7:
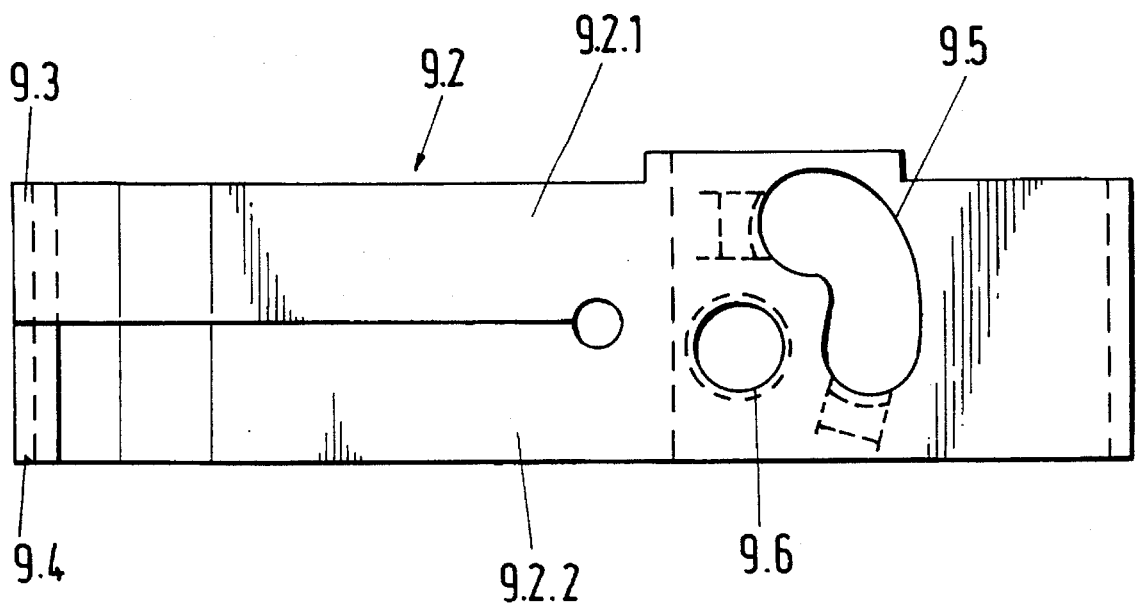
FIG. 7 is a plan view of the clamping spring of FIG. 6.

As is evident in greater detail from FIGS. 6 and 7, the clamping spring 9 is constructed double-layered and bent at right angles. In its clamping finger part, which is generally labelled 9.2, the clamping spring 9 has two clamping fingers 9.2.1 and 9.2.2 which, as is more clearly evident from FIG. 6, can be spread in the assembled state transversely to the longitudinal axis of the housing in mutually opposite directions. At the ends, the clamping fingers 9.2.1 and 9.2.2 have hooks 9.3 and 9.4, which are aligned in mutually opposite directions. The clamping spring 9 also has a curvilinear catch link 9.5, as well as a cam follower bolt 9.6, which in the assembled state engages the curvilinear catch link 20 of the catch 7. On the other hand, the cam follower bolt 21, which is to be disposed in the circular recess, is to be disposed at the other end in the track-shaped catch link 9.5 of the clamping spring 9. Moreover, a pin-shaped abutment 23 is disposed in a central region of the housing and is to be disposed in appropriate openings 14.1 and 15.1 in the side walls 14, 15 of the housing (FIGS. 1 and 2). The clamping fingered parts 9.2.1 and 9.2.2 encircle this pin-shaped abutment 23 in scissor-fashion near their hook-shaped ends 9.3 and 9.4.

If the catch 7 is rotated, for example, after inserting a screwdriver, the rotational movement of the catch 7 is transferred over the two cam follower bolts, which can ride in the two catch links, into a translatory motion of the clamping spring out of the starting stretching position (FIG. 10) into the final stretching position that can be seen in FIG. 11. At the same time, the clamping spring with the clamping fingers 9.2.1 and 9.2.2. is expanded over the pin-shaped abutment 23 transversely to the longitudinal axis of the housing towards the outside, whereupon it is braced behind the clamping edge shoulders of the supporting profile. This is carried out with the expenditure of relatively little force, the bracing with the turnbuckle then having an exceptional load carrying capacity and being outstandingly reliable.

What is claimed is:

1. A turnbuckle for connecting a hollow section with a supporting profile having recesses comprising:

a housing disposed in said hollow section, said housing having a longitudinal axis;

a clamping spring means disposed in said housing;

a rotatable catch rotatably mounted for rotatable movement between a non-lock position and a lock position;

operable means between said rotatable catch and said clamping spring means operable to dispose said clamping spring means in said housing at a starting stretching position when said rotatable catch is in said non-lock position and a final stretching position when said rotatable catch is in said lock position, said clamping spring means being receivable in said supporting profile recess when said clamping spring means is in said starting spring position, said clamping spring means clamping said supporting profile when is said final stretching position;

said operable means comprising a first and second concurrently operable interconnecting means interconnected between said rotatable catch and said clamping spring means;

said first interconnecting means comprising a first curvilinear recess in said rotatable catch and a first projection on said clamping spring means disposed in said first curvilinear recess;

said second interconnecting means comprising a second curvilinear recess in said clamping spring means and a second projection on said rotatable catch disposed in said second curvilinear recess;

said first projection being movable in said first recess and said second projection being moveable in said second recess when said rotatable catch is moved between said non-lock position to said lock position such that rotation of said rotatable catch from said non-lock position to said lock position moves said clamping spring means from said starting stretching position to said final stretching position.

2. A turnbuckle according to claim 1 wherein said first projection is integrally formed on said clamping spring means.

3. A turnbuckle according to claim 1 wherein said second projection comprises a projecting element removably mounted on said rotatable catch.

4. A turnbuckle according to claim 1 wherein said rotatable catch has a borehole, said second projection comprising a cylindrical element removably mounted in said borehole.

5. A turnbuckle according to claim 1 wherein said rotatable catch has a generally cylindrical configuration having a cylindrical axis about which the rotary catch rotates, each of said first and second projections having a generally cylindrical configuration with cylindrical axes with the cylindrical axis of said first and second projection being offset from the cylindrical axis of said rotatable catch.

6. A turnbuckle according to claim 1 wherein said housing has a housing opening, said rotatable catch having a cylindrical part rotatably disposed in said housing opening.

7. A turnbuckle according to claim 6 wherein said housing opening is designated a first housing opening, said clamping spring means having a third projection, said housing having a second housing opening, said third projection overlying said second housing opening when said clamping spring means is in said starting stretching position such that axial displacement of said rotatable catch displaces said cylindrical part of said rotary catch from said first housing opening as said third projection is received in said second housing opening, said third projection being displaced from overlying said second housing opening to preclude said second housing opening from receiving said third projection when said clamping spring means is in said final stretching position.

8. A turnbuckle according to claim 7 wherein said third projection on said clamping spring means underlies said second recess on said clamping spring means.

9. A turnbuckle according to claim 7 wherein said housing includes a housing part and a cover disposed on said housing part, said first housing opening being disposed in said cover, said second opening being disposed in said housing part.

10. A turnbuckle according to claim 9 further comprising a projection in said housing part supporting said clamping spring means as said clamping spring means moves between said starting stretch position and said final stretching position.

11. A turnbuckle according to claim 1, wherein said clamping spring means includes two clamping fingers which are movable in mutually opposite directions substantially transverse to said longitudinal axis of the housing.

12. A turnbuckle according to claim 11, wherein said clamping fingers each have a clamping hook end, the clamping hook ends of said clamping fingers being angled in mutually opposite directions.

13. A turnbuckle according to claim 11 further comprising an abutment fixed to said housing and engaging said clamping spring fingers when said clamping spring means moves from said starting stretching position to said final stretching position to thereby spread apart said clamping fingers.

14. A turnbuckle according to claim 13 wherein said housing has a terminal end, said clamping fingers each having hook shaped ends extending outwardly of said housing beyond said terminating end of said housing, said abutment comprising a fixed abutment member disposed within said housing at a location spaced from said terminating end of said housing, said fixed abutment member being disposed between said two clamping fingers to simultaneously engage said two clamping fingers and simultaneously spread apart said two clamping fingers when said clamping spring means is moved from said starting stretching position to said final stretching position.

15. A turnbuckle according to claim 13, wherein said abutment is pin-shaped.

16. A turnbuckle according to claim 15, wherein said clamping fingers encircle the pin-shaped abutment.

17. A turnbuckle for connecting a structure with a supporting profile having recesses comprising:

a housing disposed on said structure;

a clamping spring means disposed in said housing;

a rotatable catch rotatably mounted for rotatable movement between a non-lock position and a lock position;

operable means between said rotatable catch and said clamping spring means operable to dispose said clamping spring in said housing at a starting stretching position when said rotatable catch is in said non-lock position and a final stretching position when said rotatable catch is in said locking position, said clamping spring means being receivable in said supporting profile recess when said clamping spring means is in said starting spring position, said clamping spring means clamping said supporting profile when is said final stretching position;

said operable means comprising a first and second concurrently operable interconnecting means interconnected between said rotatable catch and said clamping spring means, each of said first and second interconnecting means comprising a projection and a recess with each projection being moveable in a respective one of said recesses when said rotatable catch is moved from said starting stretching position to said final stretching position.

* * * * *